United States Patent [19]

Lau

[11] Patent Number: 5,521,266
[45] Date of Patent: May 28, 1996

[54] METHOD FOR FORMING POLYMERS

[75] Inventor: Willie Lau, Ambler, Pa.

[73] Assignee: Rohm and Haas Company, Philadelphia, Pa.

[21] Appl. No.: 330,660

[22] Filed: Oct. 28, 1994

[51] Int. Cl.$^6$ .................... C08F 2/10; C08F 2/22
[52] U.S. Cl. ............................. 526/200; 526/89
[58] Field of Search ....................... 526/200, 89

[56] References Cited

U.S. PATENT DOCUMENTS

| | | |
|---|---|---|
| 4,463,151 | 7/1984 | Schulz et al. . |
| 4,463,152 | 7/1984 | Schulz et al. . |
| 4,514,552 | 4/1985 | Shay et al. . |
| 4,722,962 | 2/1988 | Shay et al. . |
| 4,734,205 | 3/1988 | Jacques et al. . |
| 4,797,223 | 1/1989 | Amick et al. . |
| 5,137,571 | 8/1992 | Eisenhart et al. . |
| 5,290,831 | 3/1994 | Di Ruocco et al. . |

FOREIGN PATENT DOCUMENTS

| | | |
|---|---|---|
| 54-061291 | 5/1979 | Japan . |
| 58-168603 | 10/1983 | Japan . |
| 62-265302 | 11/1987 | Japan . |

OTHER PUBLICATIONS

"Effect of Lipophilic Methylated β–Cyclodextrins on the Two–Phase (Water/Organic, Free Radical Polymerization of Methacrylic Esters Using Water–Soluble initiators", Norio Kunieda, et al., Makromol. Chem., Rapid Commun., vol. 5, pp. 137–140 (1984).

*Primary Examiner*—Joseph L. Schofer
*Assistant Examiner*—Wu C. Cheng
*Attorney, Agent, or Firm*—David T. Banchik

[57] ABSTRACT

An aqueous polymerization method is disclosed for forming polymers containing, as polymerized units, at least one monomer having low water solubility, including the steps of:

(1) complexing at least one monomer having low water solubility with a macromolecular organic compound having a hydrophobic cavity; and (2) polymerizing in an aqueous system from about 0.1% to about 100%, by weight of the monomer component, based on the total weight of the polymer, of the complexed monomer having low water solubility with from about 0% to about 99.9% by weight, based on the total weight of the polymer, of at least one monomer having high water solubility.

The method is also useful for forming aqueous solution polymers having low water solubility. The method is useful for polymerizing, in an aqueous system, aqueous solution polymers or emulsion polymers, particularly random copolymers, of monomer having a low water solubility which heretofore could not be made satisfactorily without the addition of an organic solvent, comonomer or a high level of surfactant to aid in solubilizing the monomer having low water solubility. The method is also useful for improving the efficiency of chain transfer agents having low water solubility used in aqueous solution and emulsion polymerizations.

9 Claims, No Drawings

METHOD FOR FORMING POLYMERS

FIELD OF THE INVENTION

This invention relates to an improved method of forming polymers, and more particularly, to an improved method of forming polymers containing, as polymerized units, at least one monomer having low water solubility in an aqueous system using a macromolecular organic compound having a hydrophobic cavity.

BACKGROUND OF THE INVENTION

Aqueous polymerization, including solution and emulsion polymerization, generally may be carried out successfully, if in the case of a solution polymerization the starting monomers and resulting polymer are water soluble and in the case of an emulsion polymerization the starting monomers not having very low water solubility. However, a number of problems are encountered if the aqueous polymerization is:

(a) a solution polymerization of at least one monomer having low water solubility; or (b) an emulsion polymerization of at least one monomer having very low water solubility.

Problems are also encountered if an aqueous solution polymerization produces a final polymer having low water solubility.

These problems include:

(1) poor conversion of the monomer having low water solubility evidenced by monomer pooling around the stirrer shaft and the presence of monomer droplets in the final product;

(2) high gel or coagulum levels;

(3) the formation of emulsion or suspension polymer during a solution polymerization or large suspension polymer particles during an emulsion polymerization;

(4) phase separation or creaming of monomer droplets or large suspension particles; and (5) abnormal (non-kinetic) distribution of the monomers having high water solubility and the monomers having low water solubility because of the nonuniform distribution during polymerization of the two types of monomers evidenced by multiple glass transition temperatures as measured by differential scanning calorimetry.

Attempts to overcome these problems when forming polymers, particularly in a random arrangement:

(a) from a monomer having low water solubility with either:
  (i) another monomer having low water solubility; or
  (ii) a monomer having high water solubility in an aqueous system either by aqueous solution or emulsion polymerization; or (b) resulting in a polymer, while formed from monomers having high water solubility, which has low water solubility has not heretofore been satisfactory without at least one of the following to aid in solubilizing the monomer or final polymer having low water solubility:

(a) the addition of at least about 5–30% by weight, based on total monomer weight, of an organic solvent;

(b) the use of a comonomer which acts as a solvent for the monomer having low water solubility; or (c) the use of a high level of surfactant.

For example, U.S. Pat. No. 4,268,641 describes the synthesis of copolymers of acrylic acid with hydrophobic nonionic surfactant acrylates via solution polymerization requiring organic solvents including aromatic, saturated aliphatic, cycloaliphatic and halogenated solvents to facilitate the reaction. For example, U.S. Pat. No. 4,734,205 describes the synthesis of copolymers of acrylamide, acrylic acid or its salts with hydrophobic alkylacrylamide or alkyl (meth)acrylate requiring high levels of surfactants to effect polymerization.

The addition of an organic solvent or high level of surfactant poses safety, health and environmental problems. The addition of a solvent may also destabilize aqueous systems to which it is added.

I have discovered a method for forming in an aqueous system a polymer containing, as polymerized units, at least one monomer having low water solubility by solution or emulsion polymerization without the addition of an organic solvent or high level of surfactant surfactant to aid in solubilizing the monomer or final polymer having low water solubility and, thus, without the attendant safety, health, environmental and stability problems associated with organic solvents and high levels of surfactants.

SUMMARY OF THE INVENTION

This invention is directed to an aqueous polymerization method for forming polymers containing, as polymerized units, at least one monomer having low water solubility, including the steps of:

(1) complexing at least one monomer having low water solubility with a macromolecular organic compound having a hydrophobic cavity; and (2) polymerizing in an aqueous system from about 0.1% to about 100%, by weight of the monomer component, based on the total weight of the polymer, of the complexed monomer having low water solubility with from about 0% to about 99.9% by weight, based on the total weight of the polymer, of at least one monomer having high water solubility.

The method is also useful for forming aqueous solution polymers having low water solubility. The method is useful for polymerizing, in an aqueous system, aqueous solution polymers or emulsion polymers, particularly random copolymers, of monomer having a low water solubility which heretofore could not be made satisfactorily without the addition of an organic solvent, comonomer or a high level of surfactant to aid in solubilizing the monomer having low water solubility. The method is also useful for improving the efficiency of chain transfer agents having low water solubility used in aqueous solution and emulsion polymerizations.

DETAILED DESCRIPTION OF THE INVENTION

As used herein, the term "water soluble" means completely soluble in water; term "having low water solubility" means having a water solubility at 25°–50° C. of no greater than 200 millimoles/liter; the term "having very low water solubility" means having a water solubility at 25°–50° C. of no greater than 50 millimoles/liter; and the term "having high water solubility" means having a water solubility at 25°–50° C. of greater than 200 millimoles/liter. As used herein, the term "(meth)acrylate" refers to methacrylate and acrylate, the term "(meth)acrylic" refers to methacrylic and acrylic and the term "(meth)acrylamide" refers to methacrylamide and acrylamide. As used herein, the term "aqueous system" describes a polymer formed and supplied in water as the continuous phase wherein no organic solvent or high level of surfactant was required to form the polymer or to store and supply the polymer.

Polymerization Method

This invention involves an aqueous polymerization method for forming polymers containing, as polymerized units, at least one monomer having low water solubility, including the steps of:

(1) complexing the monomer having low water solubility with a macromolecular organic compound having a hydrophobic cavity; and (2) polymerizing in an aqueous system from about 0.1% to about 100%, by weight of the monomer component, based on the total weight of the polymer, of the complexed monomer having low water solubility with from about 0% to about 99.9% by weight, based on the total weight of the polymer, of at least one monomer having high water solubility.

The method is also useful for forming aqueous solution polymers having low water solubility. For a solution polymer, the macromolecular organic compound having a hydrophobic cavity may be decomplexed from the polymer in an optional third step after the polymer is formed. For an emulsion polymer, the macromolecular organic compound having a hydrophobic cavity is believed to be automatically decomplexed from the polymer before or as the polymer is formed and further decomplexing is not necessary.

While the present invention provides a method for preparing polymers without the use of organic solvents or high levels of surfactants, these solvents and surfactants may be present during the polymerization. It is, however, preferable that no solvent and lower levels of surfactant be present during the polymerization. It is contemplated that it is possible that the polymerization process could contain organic solvent and higher levels of surfactant.

Complexation Step

The first step of the invention is complexing any monomer having low water solubility with a macromolecular organic compound having a hydrophobic cavity. The macromolecular organic compound having a hydrophobic cavity useful in the method of the invention include cyclodextrin and cyclodextrin derivatives; cyclic oligosaccharides having a hydrophobic cavity such as cycloinulohexose, cycloinuloheptose, and cycloinuloctose; calyxarenes; and cavitands.

The cyclodextrin and cyclodextrin derivatives useful in the method of the invention are limited only by the solubility of the cyclodextrin and cyclodextrin derivative selected under the particular polymerization conditions. Suitable cyclodextrins useful in the method of the present invention include, but are not limited to, α-cyclodextrin, β-cyclodextrin and γ-cyclodextrin. Suitable cyclodextrin derivatives useful in the method of the present invention include, but are not limited to, the methyl, triacetyl hydroxypropyl and hydroxyethyl derivatives of α-cyclodextrin, β-cyclodextrin and γ-cyclodextrin. The preferred cyclodextrin derivative is methyl-β-cyclodextrin.

The cyclic oligosaccharides having a hydrophobic cavity, such as cycloinulohexose, cycloinuloheptose, useful in the method of the invention are described by Takai et al., Journal of Organic Chemistry, 1994, volume 59, number 11, pages 2967–2975.

The calyxarenes useful in the method of the invention are described in U.S. Pat. No. 4,699,966, International Patent Publication WO 89/08092 and Japanese patent publications 1988/197544 and 1989/007837.

The cavitands useful in the method of the invention are described in Italian application 22522 A/89 and Moran et al., Journal of the American Chemical Society, volume 184, 1982, pages 5826–5828.

The monomers having a low water solubility for which the method of the invention is useful for carrying out polymerization, include, but are not limited to, α,β-ethylenically unsaturated monomers such as primary alkenes; styrene and alkylsubstituted styrene; α-methyl styrene; vinyltoluene; vinyl esters of $C_4$–$C_{30}$ carboxylic acids, such as vinyl 2-ethylhexanoate, vinyl neodecanoate and the like; vinyl chloride; vinylidene chloride; N-alkyl substituted (meth)acrylamide such as octyl acrylamide and maleic acid amide; vinyl alkyl or aryl ethers with ($C_3$–$C_{30}$) alkyl groups such as stearyl vinyl ether; ($C_1$–$C_{30}$) alkyl esters of (meth)acrylic acid, such as methyl methacrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth)acrylate, stearyl (meth)acrylate; unsaturated vinyl esters of (meth)acrylic acid such as those derived from fatty acids and fatty alcohols; multifunctional monomers such as pentaerythritol triacrylate; monomers derived from cholesterol; and the like. The hydrophobic monomers may also contain functionality, such as hydroxy, amido, aldehyde, ureido, polyether and the like. The method of the invention is also useful for polymerizing monomer having a water solubility at 25°–50° C. of at least 200 millimoles/liter but whose final homopolymer has a water solubility at 25°–50° C. of no greater than 200 millimoles/liter, including ethylene, vinyl acetate; surfactant monomers including long chain alkoxy- or alkylphenoxy-polyalkylene oxide) (meth)acrylates, such as $C_{18}H_{27}$-(ethylene oxide)$_{20}$ methacrylate and $C_{12}H_{25}$-(ethylene oxide)$_{23}$ methacrylate; and the like.

The macromolecular organic compound having a hydrophobic cavity may be complexed with the monomer having low water solubility in either of two ways:

(1) The macromolecular organic compound having a hydrophobic cavity may be mixed with the monomer having low water solubility separately and the complexed mixture, along with any other monomers, charged to the reaction vessel; or (2) The macromolecular organic compound having a hydrophobic cavity may be added to the reaction vessel before, during or after the monomer mixture has been charged.

The molar ratio of macromolecular organic compound having a hydrophobic cavity complexed with the monomer having a low water solubility depends on the type of macromolecular organic compound and the type of monomer. Generally, the molar ratio of macromolecular organic compound to monomer is from about 5:1 to about 1:5000, preferably from about 1:1 to about 1:1,000, and most preferably from about 1:1 to about 1:500. For solution polymerizations which form polymers which associate in solution, it is preferably to have molar ratios in a stoichiometric range, such as from about 5:1 to about 1:2 because the additional macromolecular organic compound is available to suppress the viscosity of the final polymeric solution. Otherwise, it is generally only necessary to have molar ratios in a catalytic range, such as from about 1:10 to about 1:1,000.

Polymerization Step

The second step of the present invention is polymerizing in an aqueous system, from about 0.1% to about 100%, by weight of the monomer component, based on the total weight of the polymer, of the complexed monomer having low water solubility with from about 0% to about 99.9% by weight, based on the total weight of the polymer, of at least one monomer having high water solubility or other monomer having low water solubility.

Suitable optional monomers having high water solubility useful in the method of the present invention include, but are not limited to, α,β-monoethylenically unsaturated monomers containing acid-functionality such as monomers containing at least one carboxylic acid group including acrylic acid and methacrylic acid, acryloxypropionic acid, (meth)acryloxypropionic acid, itaconic acid, maleic acid or anhydride, fumaric acid, crotonic acid, monoalkyl maleates, monoalkyl fumarates, monoalkyl itaconates and the like; acid substituted (meth)acrylates and sulfoethyl methacrylate; acid substituted (meth)acrylamides such as 2-acrylamido-2-methylpropylsulfonic acid; basic substituted (meth)acrylates and (meth)acrylamides, such as amine-substituted methacrylates including dimethylaminoethyl methacrylate, tertiary-butylaminoethyl methacrylate and dimethylaminopropyl methacrylamide and the like; acrylonitrile; (meth)acrylamide and substituted (meth)acrylamide, such as diacetone acrylamide; (meth)acrolein; methyl acrylate and the like.

The reaction mixture minimally contains:

(a) at least one macromolecular compound having a hydrophobic cavity;

(b) at least one monomer having low water solubility; and (c) water.

The polymers of the invention may be prepared by conventional free radical aqueous solution or emulsion polymerization techniques well known in the art. The polymerization may be carried out as a batch, semicontinuous or continuous reaction. The polymerization may also be carried out as a part of a sequential polymerization. While the present invention provides a method for preparing polymers without the use of organic solvents, these solvents may actually be present during the polymerization. It is, however, preferable that no solvent be present during the polymerization.

A free radical initiator is utilized in the aqueous solution and emulsion polymerizations. Suitable free radical initiators include hydrogen peroxide; tert-butyl hydroperoxide; sodium, potassium, lithium and ammonium persulfate. A reducing agent, such as a bisulfite, including an alkali metal metabisulfite, hydrosulfite, and hyposulfite; and sodium formaldehyde sulfoxylate or a reducing sugar such as ascorbic acid, may be used in combination with the initiator to form a redox system. The amount of initiator may be from 0.01% by weight to about 2% by weight of the monomer charged and in a redox system, a corresponding range of 0.01% by weight to about 2% by weight of reducing agent may be used. Transition metal catalysts, such as iron salts, may be used.

The polymerization temperature may be in the range of about 10° C. to 120° C. in the aqueous emulsion and solution polymerizations. In the case of the persulfate systems, the temperature is preferably in the range of 60° C. to 90° C. In the redox system, the temperature is preferably in the range of 20° C. to 70° C.

For emulsion polymers, the emulsifiers or dispersing agents employed for preparing the monomer emulsions or polymer emulsions may be anionic, cationic or non-ionic types. Also a mixture of any two types may be used. Suitable nonionic emulsifiers include, but are not limited to, ethoxylated octylphenols, ethoxylated nonylphenols, ethoxylated fatty alcohols and the like. Suitable anionic emulsifiers include, but are not limited to, sodium lauryl sulfate, sodium dodecylbenzene sulfonate, sulfated and ethoxylated derivatives of nonylphenols, octylphenols and fatty alcohols, esterified sulfosuccinates and the like. Suitable cationic emulsifiers include, but are not limited to, laurylpyridinium chlorides, cetyldimethyl amine acetate, ($C_8$–$C_{18}$) alkyldimethylbenzylammonium chlorides and the like. The level of emulsifier may be from about 0.1% to about 10% by weight, based on total monomer charged.

Decomplexation Step

An optional third step of the method of the present invention for polymers formed by solution polymerization is decomplexing the macromolecular organic compound having a hydrophobic cavity from the polymer by adding a decomplexing agent, i.e., a material which has an affinity for the macromolecular organic compound having a hydrophobic cavity. For solution polymers, the macromolecular organic compound having a hydrophobic cavity may be decomplexed from the polymer after the polymer is formed. For emulsion polymers, the macromolecular organic compound having a hydrophobic cavity may be automatically decomplexed from the polymer before the polymer is formed and further decomplexing is generally not necessary.

Suitable decomplexing agents, include but are not limited to, conventional surface active agents including, nonionic, anionic and cationic surfactants; and organic solvents, such as for example, ethanol and TEXANOL® solvent. Organic solvents are not preferred. I have found that it is preferable to utilize about 1–10 moles of the decomplexing agent per mole of macromolecular organic compound having a hydrophobic cavity added to the polymer to achieve complete decomplexation.

Both the complexation and decomplexation steps are easily achieved by the addition of the reactants with mixing. No special purification or separation steps are required at room temperature. It may not be necessary to add additional surfactant to cause decomplexation process to occur if the formulation into which the polymers made by the method of the present invention contain any of the decomplexing agents at a level effective to decomplex the macromolecular organic compound having a hydrophobic cavity.

Solution copolymers produced by the method of this invention which act as associative thickeners may beneficially used as described in U.S. Pat. No. 5,137,571. This patent discloses a method of suppressing the viscosity of associative thickeners using cyclodextrins and cyclodextrin derivatives. After the solution copolymers of the present invention are formed, but before they are decomplexed from the cyclodextrin or cyclodextrin derivative, the solution copolymers may be added directly into a coating composition and decomplexed therein.

Chain Transfer Agents

In an alternate embodiment, I have discovered that the method of present invention is also useful for improving the efficiency of chain transfer agents having low water solubility used in aqueous solution and emulsion polymerizations. The method of the present invention reduces the level of chain transfer agent having low water solubility necessary to reduce the molecular weight of the final polymer in an emulsion polymerization reaction. The method involves the steps of:

(1) complexing a chain transfer agent having low water solubility with macromolecular organic compound having a hydrophobic cavity; and (2) adding the complex to an emulsion polymerization reaction.

These two steps may be performed in situ and need not be carried out in a separate container.

Typical chain transfer agents having low water solubility include hydrophobic mercaptans, such as n-dodecyl mercaptan, thiophenol; hydrophobic polymercaptans; hydrophobic halogen compounds, such as bromotrichloromethane; and the like.

The molar ratio of macromolecular organic compound having a hydrophobic cavity complexed with the chain transfer agent having low water solubility depends on the type of macromolecular organic compound having a hydrophobic cavity and the type of chain transfer agent having low water solubility. Generally, the molar ratio of macromolecular organic compound having a hydrophobic cavity to chain transfer agent having low water solubility is from about 1:1 to about 1:5000, preferably from about 1:2 to about 1:1,000.

Incorporation of Monomers Having Low Water Solubility

The method of the present invention may be used to form copolymers of monomers having low water solubility, particularly random copolymers, which heretofore could not be made without the addition of a solvent or surfactant to aid in solubilizing the hydrophobic monomer. "Random copolymer," as used herein, refers to a polymer formed from at least two different monomers wherein the monomer units are arranged randomly not forming repeating blocks of monomer units. For an emulsion polymer, this lack of randomness and incorporation may be judged by:

(1) poor conversion of the monomer having low water solubility evidenced by monomer pooling around the stirrer shaft and the presence of monomer droplets in the final product;

(2) high gel or coagulum levels;

(3) the formation of large suspension polymer particles during an emulsion polymerization;

(4) phase separation or creaming of monomer droplets or large suspension particles; and (5) abnormal (non-kinetic) distribution of the monomers having high water solubility and the monomers having low water solubility because of the nonuniform distribution during polymerization of the two types of monomers evidenced by multiple glass transition temperatures as measured by differential scanning calorimetry.

For a solution polymer, this lack randomness and incorporation may be judged by how efficiently the solution polymer is able to thicken and may be determined by comparing the complexed and decomplexed solubilized solution viscosities of the polymer. If the two solution viscosities are approximately the same, then the monomer having low water solubility has not been incorporated into the polymer with the monomer having high water solubility. If the decomplexed solubilized solution viscosity is greater than the complexed solubilized solution viscosity, then the monomer having low water solubility has been incorporated into the polymer and is available to interact and thicken once the macromolecular organic compound having a hydrophobic cavity has been decomplexed from it.

The copolymers formed by the method of the invention have a random arrangement of:

(a) about 1.0% to about 99.0% by weight, based on the total weight of the copolymer, of a monomer having low water solubility; and (b) about 1.0% to about 99.0% by weight, based on the total weight of the copolymer, of at least one monomer having high water solubility wherein the random copolymers may be formed by either aqueous solution or emulsion polymerization in water without organic solvent or a high level of surfactant.

The novel copolymers of the invention are useful in any method where hydrophobicity is desired, such as methods of improving water resistance and adhesion to hydrophobic substrates, in such applications areas as architectural and industrial coatings including paints, wood coatings, inks; paper coatings; textile and nonwoven binders and finishes; adhesives; mastics; floor polishes; leather coatings; plastics; plastic additives; petroleum additives and the like. The novel copolymers of the invention are also for forming polymers requiring both monomers having low water solubility and monomers having high water solubility, such as thickeners, rheology modifiers, dispersants; formulation chemicals; and the like.

The following examples illustrate specific aspects and particular embodiments of the invention which, however, are not to be construed as limited thereby.

Notes

The following abbreviations are used in the examples:

| | |
|---|---|
| LA | lauryl acrylate |
| LMA | lauryl methacrylate |
| BA | butyl acrylate |
| EA | ethyl acrylate |
| 2-EHA | 2-ethylhexyl acrylate |
| MMA | methyl methacrylate |
| MAA | methacrylic acid |
| AA | acrylic acid |
| AM | acrylamide |
| VA | vinyl acetate |
| $C_{18}H_{37}$-(EO)$_{20}$ MA | $C_{18}H_{37}$-(ethylene oxide)$_{20}$ methacrylate |
| $C_{12}H_{25}$-(EO)$_{23}$ MA | $C_{12}H_{25}$-(ethylene oxide)$_{23}$ methacrylate |
| HEA | hydroxyethyl acrylate |
| HEMA | hydroxyethyl methacrylate |
| NVP | n-vinyl pyrrolidone |
| Tg (°C.) | glass transition temperature in degrees Celsius |
| g | grams |
| μ | microns |

EXAMPLE 1: Solution Polymerization—Cyclodextrin in Monomer Mix

The solution polymerizations in this example were carried out in a 4-liter round bottom flask with four necks equipped with a mechanical stirrer, temperature control device, condenser, monomer and initiator feed lines and a nitroget inlet. Deionized water was introduced into the reaction flask at room temperature in accordance to Table 1.1 (H$_2$O #1) in grams. The contents were heated to 55° C. while stirring under nitrogen purge. A monomer mixture, deionized water (H$_2$O #2) and methyl-β-cyclodextrin were added to form the reaction mixture in accordance to Table 1.1 in grams.

TABLE 1.1

| Solution Polymer | AA | AM | MAA | HEA | HEMA | NVP | $C_{18}H_{37}$-$(EO)_{20}$ MA | $C_{12}H_{25}$-$(EO)_{23}$ MA | $H_2O$ #1 | $H_2O$ #2 | CD |
|---|---|---|---|---|---|---|---|---|---|---|---|
| Control 1 | 400.0 | 0 | 0 | 0 | 0 | 0 | 0 | 0 | 600 | 200 | 0 |
| Control 2 | 400.0 | 0 | 0 | 0 | 0 | 0 | 0 | 0 | 400 | 200 | 86.0 |
| Control 3 | 0 | 400.0 | 0 | 0 | 0 | 0 | 0 | 0 | 450 | 400 | 43.0 |
| 1C-S (Comparative) | 400.0 | 0 | 17.2 | 0 | 0 | 0 | 0 | 40.0 | 580 | 200 | 0 |
| 2C-S (Comparative) | 0 | 342.8 | 17.2 | 0 | 0 | 0 | 40.0 | 0 | 450 | 400 | 0 |
| 1-S | 342.8 | 0 | 17.2 | 0 | 0 | 0 | 0 | 40.0 | 650 | 200 | 43.0 |
| 2-S | 371.4 | 0 | 8.6 | 0 | 0 | 0 | 0 | 20.0 | 615 | 200 | 21.5 |
| 3-S | 342.8 | 0 | 17.2 | 0 | 0 | 0 | 40.0 | 0 | 400 | 200 | 43.1 |
| 4-S | 0 | 342.8 | 17.1 | 0 | 0 | 0 | 80.0 | 0 | 450 | 329 | 43.0 |
| 5-S | 0 | 342.8 | 17.1 | 0 | 0 | 0 | 40.0 | 0 | 450 | 400 | 43.0 |
| 6-S | 0 | 342.8 | 17.1 | 0 | 0 | 0 | 20.0 | 0 | 450 | 436 | 43.0 |
| 7-S | 342.8 | 0 | 17.2 | 0 | 0 | 0 | 0 | 40.0 | 618 | 200 | 23.2 |
| 9-S | 342.8 | 0 | 17.2 | 0 | 0 | 0 | 0 | 40.0 | 734 | 200 | 92.6 |
| 11-S | 302.8 | 0 | 17.1 | 40.0 | 0 | 0 | 40.0 | 0 | 650 | 200 | 43.0 |
| 12-S | 262.8 | 0 | 17.1 | 80.0 | 0 | 0 | 40.0 | 0 | 650 | 200 | 43.0 |
| 13-S | 302.9 | 0 | 17.1 | 0 | 40.0 | 0 | 40.0 | 0 | 650 | 200 | 43.0 |
| 14-S | 262.9 | 0 | 17.1 | 0 | 80.0 | 0 | 40.0 | 0 | 650 | 200 | 43.0 |
| 23-S | 0 | 342.8 | 17.2 | 0 | 0 | 0 | 40 | 0 | 450 | 400 | 129.2 |
| 24-S | 342.8 | 0 | 17.2 | 0 | 0 | 0 | 40 | 0 | 450 | 400 | 86.0 |
| 25-S | 342.8 | 0 | 17.2 | 0 | 0 | 0 | 40 | 0 | 450 | 400 | 20.7 |
| 26-S | 342.8 | 0 | 17.2 | 0 | 0 | 0 | 40* | 0 | 450 | 400 | 86.0 |

NOTE*
Analog of $C_{18}H_{37}$-$(EO)_{20}$ MA prepared from $C_{18}H_{37}$-$(EO)_{20}$H and 3-isopropenyl-$\alpha,\alpha$-dimethylbenzyl isocyanate A first initiator combination consisting of 6.7 grams of a ferric sulfate solution (0.15%) and 0.2 grams of sodium hydrosulfite dissolved in 10 grams of deionized water was added to the reaction flask. A redox initiator combination consisting of 0.2% of ammonium persulfate and 0.2% of sodium bisulfite, both based on the total weight of the monomers, dissolved in 55 grams of deionized water were prepared. The reaction mixture and the redox initiator combinations were fed separately into the reaction flask over a two hour period. The final polymer product was collected as a viscous solution. The following table summarizes the final polymer compositions (shown as weight % based on weight of total polymer):

EXAMPLE 2: Solution Polymerization—Cyclodextrin Added to Kettle

The solution polymerizations in this example were carried out in a 4-liter round bottom flask with four necks equipped with a mechanical stirrer, temperature control device, condenser, monomer and initiator feed lines and a nitroget inlet. Deionized water ($H_2O$ #1) and methyl-$\beta$-cyclodextrin were introduced into the reaction flask at room temperature in accordance with Table 2.1 in grams. The contents were heated to 60° C. while stirring under nitrogen purge. A monomer mixture and deionized water ($H_2O$ #2) were prepared to form the reaction mixture in accordance with Table 2.1 in grams.

TABLE 1.2

| Solution Polymer | AA | AM | MAA | HEA | HEMA | NVP | $C_{18}H_{37}$-$(EO)_{20}$ MA | $C_{12}H_{25}$-$(EO)_{23}$ MA | CD:hydrophobe |
|---|---|---|---|---|---|---|---|---|---|
| Control 1 | 100 | 0 | 0 | 0 | 0 | 0 | 0 | 0 | — |
| Control 2 | 100 | 0 | 0 | 0 | 0 | 0 | 0 | 0 | — |
| Control 3 | 0 | 100 | 0 | 0 | 0 | 0 | 0 | 0 | — |
| 1C-S (Comparative) | 85.7 | 0 | 4.3 | 0 | 0 | 0 | 0 | 10 | 0:1 |
| 2C-S (Comparative) | 85.7 | 0 | 4.3 | 0 | 0 | 0 | 10 | 0 | 0:1 |
| 1-S | 85.7 | 0 | 4.3 | 0 | 0 | 0 | 0 | 10 | 1:1 |
| 2-S | 92.9 | 0 | 2.2 | 0 | 0 | 0 | 0 | 5 | 1:1 |
| 3-S | 85.7 | 0 | 4.3 | 0 | 0 | 0 | 10 | 0 | 1:1 |
| 4-S | 0 | 71.4 | 8.6 | 0 | 0 | 0 | 20 | 0 | 1:1 |
| 5-S | 0 | 85.7 | 4.3 | 0 | 0 | 0 | 10 | 0 | 1:1 |
| 6-S | 0 | 92.8 | 2.2 | 0 | 0 | 0 | 5 | 0 | 1:1 |
| 7-S | 85.7 | 0 | 4.3 | 0 | 0 | 0 | 0 | 10 | 0.5:1 |
| 9-S | 85.7 | 0 | 4.3 | 0 | 0 | 0 | 0 | 10 | 2:1 |
| 11-S | 75.7 | 0 | 4.3 | 10 | 0 | 0 | 10 | 0 | 1:1 |
| 12-S | 65.7 | 0 | 4.3 | 20 | 0 | 0 | 10 | 0 | 1:1 |
| 13-S | 75.7 | 0 | 4.3 | 0 | 10 | 0 | 10 | 0 | 1:1 |
| 14-S | 65.7 | 0 | 4.3 | 0 | 20 | 0 | 10 | 0 | 1:1 |
| 23-S | 0 | 85.7 | 4.3 | 0 | 0 | 0 | 10 | 0 | 3:1 |
| 24-S | 0 | 85.7 | 4.3 | 0 | 0 | 0 | 10 | 0 | 2:1 |
| 25-S | 0 | 85.7 | 4.3 | 0 | 0 | 0 | 10 | 0 | 0.5:1 |
| 26-S | 0 | 85.7 | 4.3 | 0 | 0 | 0 | 10 | 0 | 2:1 |

TABLE 2.1

| Solution Polymer | AA | AM | MAA | HEA | HEMA | NVP | $C_{18}H_{37}$-$(EO)_{20}$ MA | $C_{12}H_{25}$-$(EO)_{23}$ MA | $H_2O$ #1 | $H_2O$ #2 | CD |
|---|---|---|---|---|---|---|---|---|---|---|---|
| 10-S | 771.3 | 0 | 38.6 | 0 | 0 | 0 | 0 | 90.0 | 526 | 1170 | 46.6 |
| 15-S | 160.0 | 0 | 20.0 | 0 | 0 | 0 | 0 | 20.0 | 117 | 392 | 10.4 |
| 16-S | 140.0 | 0 | 40.0 | 0 | 0 | 0 | 0 | 20.0 | 117 | 392 | 10.4 |
| 17-S | 151.4 | 0 | 8.6 | 0 | 0 | 20 | 0 | 20.0 | 117 | 392 | 10.4 |
| 18-S | 342.8 | 0 | 17.2 | 0 | 0 | 0 | 0 | 40 | 337 | 519 | 46.2 |
| 19-S | 342.8 | 0 | 17.2 | 0 | 0 | 0 | 0 | 40 | 337 | 519 | 23.1 |
| 20-S | 342.8 | 0 | 17.2 | 0 | 0 | 0 | 0 | 40 | 337 | 519 | 11.6 |
| 21-S | 342.8 | 0 | 17.2 | 0 | 0 | 0 | 0 | 40 | 674 | 182 | 92.4 |
| 22-S | 342.8 | 0 | 17.2 | 0 | 0 | 0 | 0 | 40 | 337 | 519 | 23.1* |

NOTE*
β-cyclodextrin

A first initiator combination consisting of 6.7 grams of a ferric sulfate solution (0.15%) and 0.2 grams of sodium hydrosulfite dissolved in 10 grams of deionized water was added to the reaction flask. A redox initiator combination consisting of 0.2% of ammonium persulfate and 0.2% of sodium bisulfite, both based on the total weight of the monomers, dissolved in 135 grams of deionized water were prepared. The reaction mixture and the redox initiator combinations were fed separately into the reaction flask over a two hour period. The final polymer product was collected as a viscous solution.

The following table summarizes the final polymer compositions (shown as weight % based on weight of total polymer):

TABLE 2.2

| Solution Polymer | AA | AM | MAA | HEA | HEMA | NVP | $C_{18}H_{37}$-$(EO)_{20}$ MA | $C_{12}H_{25}$-$(EO)_{23}$ MA | CD: hydrophobe |
|---|---|---|---|---|---|---|---|---|---|
| 10-S | 85.7 | 0 | 4.3 | 0 | 0 | 0 | 0 | 10 | 0.5:1 |
| 15-S | 80 | 0 | 10 | 0 | 0 | 0 | 0 | 10 | 0.5:1 |
| 16-S | 70 | 0 | 20 | 0 | 0 | 0 | 0 | 10 | 0.5:1 |
| 17-S | 75.7 | 0 | 4.3 | 0 | 0 | 10 | 0 | 10 | 0.5:1 |
| 18-S | 85.7 | 0 | 4.3 | 0 | 0 | 0 | 0 | 10 | 1:1 |
| 19-S | 85.7 | 0 | 4.3 | 0 | 0 | 0 | 0 | 10 | 0.5:1 |
| 20-S | 85.7 | 0 | 4.3 | 0 | 0 | 0 | 0 | 10 | 0.25:1 |
| 21-S | 85.7 | 0 | 4.3 | 0 | 0 | 0 | 0 | 10 | 2:1 |
| 22-S | 85.7 | 0 | 4.3 | 0 | 0 | 0 | 0 | 10 | 0.5:1 |

EXAMPLE 3: Characterization of Solution Polymers

To determine whether, and to what extent, the monomers having low water solubility of Examples 1 and 2 were actually incorporated into the final polymer, the solubilized solution viscosity of the final polymer complexed (CSSV) and decomplexed with dodecyl benzene sulfonate or sodium lauryl sulfate surfactant (DSSV) were measured by titrating with the decomplexing agent until a constant viscosity was reached. The results are shown in Table 3.1.

TABLE 3.1

| Solution Polymer | CSSV (centipoise) | DSSV (centipoise) | Level of Thickener Solids (by weight %) |
|---|---|---|---|
| Control 1 | <100 | <100 | 5 |
| Control 2 | <100 | <100 | 5 |
| Control 3 | <100 | <100 | 5 |
| 1C-S (Comparative) | 167 | 252 | 5 |
| 2C-S (Comparative) | <100 | <100 | 5 |
| 1-S | 182 | 27,670 | 5 |
| 2-S | 66 | 14,600 | 5 |
| 3-S | 302 | 43,500 | 5 |
| 4-S | <100 | 18,636 | 3 |
| 5-S | <100 | 7,678 | 5 |
| 6-S | <100 | 769 | 10 |
| 7-S | <100 | 2,569 | 5 |
| 9-S | <100 | 22,600 | 5 |
| 10-S | <100 | 3,900 | 2 |
| 11-S | 77 | 5,640 | 5 |
| 12-S | 44 | 4,120 | 5 |
| 13-S | 98 | 7,860 | 5 |
| 14-S | 64 | 5,140 | 5 |
| 15-S | <100 | 25,600 | 3 |
| Control 1 | <100 | <100 | 5 |
| Control 2 | <100 | <100 | 5 |
| Control 3 | <100 | <100 | 5 |
| 1C-S (Comparative) | 167 | 252 | 5 |
| 2C-S (Comparative) | <100 | <100 | 5 |
| 16-S | <100 | 3,360 | 3 |
| 17-S | <100 | 55,700 | 3 |
| 18-S | <100 | 33,032 | 5 |
| 19-S | <100 | 29,553 | 5 |
| 20-S | <100 | 9,557 | 5 |
| 21-S | <100 | 17,396 | 5 |

TABLE 3.1-continued

| Solution Polymer | CSSV (centipoise) | DSSV (centipoise) | Level of Thickener Solids (by weight %) |
|---|---|---|---|
| 22-S | <100 | 3,479 | 5 |
| 23-S | <100 | 32,872 | 5 |
| 24-S | <100 | 59,987 | 5 |
| 25-S | <100 | 236 | 5 |
| 26-S | <100 | 14,396 | 5 |

Actual incorporation of the surfactant monomer into the polymer was indicated by an increase in the viscosity when the decomplexing agent (surfactant) was added. Sufficient surfactant determined by titration was added to fully decomplex the polymer. When the methyl-β-cyclodextrin was decomplexed from the polymer, the hydrophobic monomer portions of the polymer were released and thickened the solution to which the polymer had been added. For the controls containing no surfactant monomer, no change was seen because there were no hydrophobic moieties incorporated into the polymer. For the comparative, little change was seen because little, if any, of the surfactant monomer was incorporated into the polymer.

The effect of increasing levels of hydrophobicity was indicated by increased thickening efficiency (Solution Polymers 1-S and 2-S and Solution Polymers 4-S, 5-S and 6-S).

The effect of the size of the hydrophobic moiety was indicated by increased thickening efficiency for larger hydrophobic moieties (comparing Solution Polymers 3-S— larger hydrophobe and 7-S—smaller hydrophobe)

EXAMPLE 4: Emulsion Polymerization—Cyclodextrin Added in Kettle

The emulsion polymerizations in this example were carried out in a 4-liter round bottom flask with four necks equipped with a mechanical stirrer, temperature control device, condenser, monomer and initiator feed lines and a nitroget inlet.

Method A

Deionized water ($H_2O$ #1) and Triton® XN-45S anionic surfactant (Triton #1) were introduced into the reaction flask at room temperature in accordance with Table 4.1 in grams. The contents were heated to 85° C. while stirring under nitrogen purge. A monomer emulsion of deionized water ($H_2O$ #2), Triton® XN-45S anionic surfactant (Triton #2) and monomers was prepared in accordance with Table 4.1 in grams.

At 85° C., 3% by weight of the total monomer emulsion was introduced into the reaction kettle followed by 0.35% by weight of sodium carbonate (based on the total monomer weight) in 25 grams of deionized water and 0.35% by weight of sodium persulfate (based on the total monomer weight) in 30 grams of deionized water. After the exotherm subsided, methyl-β-cyclodextrin and Triton XN-45S (Triton #3) anionic surfactant were added in accordance with Table 4.1 in grams. The remainder of the monomer emulsion was fed over a period of three hours together with an initiator solution of 0.05% (based on total monomer weight) of sodium persulfate in 210 grams of deionized water.

Method B

Deionized water ($H_2O$ #1), Triton® XN-45S anionic surfactant (Triton #1), methyl β-cyclodextrin and 2.0 grams of glacial acetic acid were introduced into the reaction flask at room temperature in accordance with Table 4.1 in grams. The contents were heated at 75° C. while stirring under nitrogen purge. A monomer emulsion of deionized water ($H_2O$ #2), Triton® XN-45S anionic surfactant (Triton #2) and monomers was prepared in accordance with Table 4.1 in grams. Initiator solutions of 1.7 grams of t-butyl hydroperoxide, 1.8 grams of ammonium persulfate in 105 grams of deionized water and 2.7 grams of sodium bisulfite in 105 grams of deionized water were prepared.

At 75° C., 0.2 grams of sodium bisulfite in 10 grams of deionized water, 0.44 grams of ammonium persulfate in 10 grams of deionized water and 15 grams of ferrous sulphate solution (0.15% by weight) were added to the reaction flask. The monomer emulsion and initiator solutions were fed over a period of three hours maintaining the temperature at 75° C.

Table 4.2 summarizes the final polymer compositions (shown as weight % based on weight of total polymer). Note**: Prepared by Method B; others made by Method A

TABLE 4.1

| Monomer Emulsion | LA | LMA | BA | MMA | MAA | 2-EHA | VA | $H_2O$ #1 | $H_2O$ #2 | Triton #1 | Triton #2 | Triton #3 |
|---|---|---|---|---|---|---|---|---|---|---|---|---|
| 1C-E (Comparative) | 300 | 0 | 0 | 294 | 6 | 0 | 0 | 250 | 250 | 1.2 | 1.8 | 0 |
| 2C-E (Comparative) | 0 | 675 | 10 | 660 | 15 | 0 | 0 | 400 | 625 | 6.9 | 4.5 | 3.8 |
| 1-E | 300 | 0 | 375 | 810 | 15 | 0 | 0 | 625 | 625 | 3.1 | 4.5 | 0 |
| 2-E | 240 | 0 | 120 | 234 | 6 | 0 | 0 | 250 | 250 | 1.2 | 1.8 | 0 |
| 3-E | 240 | 0 | 18 | 336 | 6 | 0 | 0 | 250 | 250 | 1.2 | 1.8 | 0 |
| 4-E | 240 | 0 | 0 | 354 | 6 | 0 | 0 | 300 | 180 | 1.2 | 1.8 | 0 |
| 5-E | 675 | 0 | 0 | 810 | 15 | 0 | 0 | 625 | 625 | 3.1 | 4.5 | 0 |
| 6-E | 300 | 0 | 0 | 294 | 6 | 0 | 0 | 300 | 180 | 1.2 | 1.8 | 0 |
| 7-E | 300 | 0 | 288 | 0 | 12 | 0 | 0 | 250 | 250 | 1.2 | 1.8 | 0 |
| 8-E | 588 | 0 | 0 | 0 | 12 | 0 | 0 | 250 | 250 | 1.2 | 1.8 | 0 |
| 9-E | 0 | 300 | 450 | 735 | 15 | 0 | 0 | 625 | 625 | 3.1 | 4.5 | 0 |
| 10-E | 0 | 300 | 525 | 660 | 15 | 0 | 0 | 625 | 625 | 3.1 | 4.5 | 0 |
| 11-E | 0 | 525 | 75 | 960 | 15 | 0 | 0 | 625 | 625 | 3.1 | 4.5 | 0 |
| 12-E | 0 | 525 | 0 | 960 | 15 | 0 | 0 | 625 | 625 | 3.1 | 4.5 | 0 |
| 13-E | 0 | 600 | 585 | 300 | 15 | 0 | 0 | 625 | 625 | 3.1 | 4.5 | 0 |
| 14-E | 0 | 600 | 150 | 735 | 15 | 0 | 0 | 625 | 625 | 3.1 | 4.5 | 0 |
| 15-E | 0 | 600 | 435 | 450 | 15 | 0 | 0 | 625 | 625 | 3.1 | 4.5 | 0 |
| 16-E | 0 | 600 | 75 | 810 | 15 | 0 | 0 | 625 | 625 | 3.1 | 4.5 | 3.8 |
| 17-E | 0 | 600 | 0 | 885 | 15 | 0 | 0 | 400 | 625 | 3.1 | 1.8 | 0 |

TABLE 4.1-continued

| Monomer Emulsion | LA | LMA | BA | MMA | MAA | 2-EHA | VA | H₂O #1 | H₂O #2 | Triton #1 | Triton #2 | Triton #3 |
|---|---|---|---|---|---|---|---|---|---|---|---|---|
| 18-E | 0 | 675 | 225 | 585 | 15 | 0 | 0 | 625 | 625 | 3.1 | 1.8 | 0 |
| 19-E | 0 | 675 | 150 | 660 | 15 | 0 | 0 | 625 | 625 | 3.1 | 1.8 | 0 |
| 20-E | 0 | 675 | 0 | 810 | 15 | 0 | 0 | 400 | 625 | 3.1 | 4.5 | 0 |
| 21-E | 0 | 150 | 0 | 147 | 3 | 0 | 0 | 300 | 90 | 0.6 | 0.9 | 0 |
| 22-E | 0 | 300 | 288 | 0 | 12 | 0 | 0 | 250 | 250 | 1.2 | 0.9 | 0 |
| 23-E | 296 | 0 | 0 | 0 | 0 | 0 | 1200 | 625 | 625 | 3.1 | 1.8 | 3.8 |
| 24-E* | 0 | 296 | 0 | 0 | 0 | 0 | 1200 | 625 | 625 | 3.1 | 4.5 | 0 |
| 25-E | 0 | 0 | 150 | 660 | 15 | 675 | 0 | 625 | 625 | 3.1 | 4.5 | 3.8 |
| 26-E* | 0 | 0 | 296 | 0 | 0 | 0 | 1200 | 625 | 625 | 3.1 | 4.5 | 0 |

TABLE 4.2

| Emulsion Polymer | LA | LMA | BA | MMA | MAA | 2-EHA | VA |
|---|---|---|---|---|---|---|---|
| 1C-E (Comparative) | 50 | 0 | 0 | 49 | 1 | 0 | 0 |
| 2C-E (Comparative) | 0 | 45 | 10 | 44 | 1 | 0 | 0 |
| 1-E | 20 | 0 | 25 | 54 | 1 | 0 | 0 |
| 2-E | 40 | 0 | 20 | 39 | 1 | 0 | 0 |
| 3-E | 40 | 0 | 3 | 56 | 1 | 0 | 0 |
| 4-E | 40 | 0 | 0 | 59 | 1 | 0 | 0 |
| 5-E | 45 | 0 | 0 | 54 | 1 | 0 | 0 |
| 6-E | 50 | 0 | 0 | 49 | 1 | 0 | 0 |
| 7-E | 50 | 0 | 48 | 0 | 2 | 0 | 0 |
| 8-E | 98 | 0 | 0 | 0 | 2 | 0 | 0 |
| 9-E | 0 | 20 | 30 | 49 | 1 | 0 | 0 |
| 10-E | 0 | 20 | 35 | 44 | 1 | 0 | 0 |
| 11-E | 0 | 35 | 5 | 64 | 1 | 0 | 0 |
| 12-E | 0 | 35 | 0 | 64 | 1 | 0 | 0 |
| 13-E | 0 | 40 | 39 | 20 | 1 | 0 | 0 |
| 14-E | 0 | 40 | 10 | 49 | 1 | 0 | 0 |
| 15-E | 0 | 40 | 29 | 30 | 1 | 0 | 0 |
| 16-E | 0 | 40 | 5 | 54 | 1 | 0 | 0 |
| 17-E | 0 | 40 | 0 | 59 | 1 | 0 | 0 |
| 18-E | 0 | 45 | 15 | 39 | 1 | 0 | 0 |
| 19-E | 0 | 45 | 10 | 44 | 1 | 0 | 0 |
| 20-E | 0 | 45 | 0 | 54 | 1 | 0 | 0 |
| 21-E | 0 | 50 | 0 | 49 | 1 | 0 | 0 |
| 22-E | 0 | 50 | 48 | 0 | 2 | 0 | 0 |
| 23-E | 20 | 0 | 0 | 0 | 0 | 0 | 80 |
| 24-E | 0 | 20 | 0 | 0 | 0 | 0 | 80 |
| 25-E | 0 | 0 | 10 | 44 | 1 | 45 | 0 |
| 26-E | 0 | 0 | 20 | 0 | 0 | 0 | 80 |

EXAMPLE 5: Characterization of Emulsion Polymers

Several techniques were used to determine whether the monomers having very low water solubility of Example 4 were actually incorporated randomly into the final polymer. First, lack of pooling of monomer having very low water solubility around the stirring vortex was evidence of good conversion of the monomer having very low water solubility into the final polymer. Second, lack of large 1–10 microns particles and monomer droplets, collected (as is or by centrifugation or from creamy layer) and characterized by optical microscopy, was evidence of good incorporation of the monomer having very low water solubility into the final polymer. Third, lack of formation of gel (collected through a 100 mesh screen) was evidence that the polymerization generally ran well. Finally, a single glass transition temperature at approximately the calculated copolymer values using literature data, as measured by differential scanning calorimetry at a heating rate of 20° C./minute, was evidence of good incorporation of the monomer having very low water solubility to form a random copolymer. The results are shown in Table 5.1.

TABLE 5.1

| Emulsion Polymer | Monomer Pooling | Large (1–10μ) Particles and Monomer Droplets | Gel | Tg (°C.) |
|---|---|---|---|---|
| 1C-E (Comparative) | yes | yes | >20% | −13.6, 13.8 (2 transitions) |
| 2C-E (Comparative) | yes | yes | >20% | −30.7, 18.0 (2 transitions) |
| 1-E | no | no | <1% | 17.5 |
| 2-E | no | no | <1% | −10.5 |
| 3-E | no | no | <1% | 32.4 |
| 4-E | no | no | <1% | 23.7 |
| 5-E | no | no | <1% | 12.9 |
| 6-E | no | no | <1% | 4.5 |
| 7-E | no | no | <1% | −52.2 |
| 8-E | no | no | 10% | −53.3 |
| 9-E | no | no | <1% | 19.3 |
| 10-E | no | no | <1% | 11.3 |
| 11-E | no | no | <1% | 48.8 |
| 12-E | no | no | <1% | 58.0 |
| 13-E | no | no | <1% | −27.0 |
| 14-E | no | no | <1% | 27.6 |
| 15-E | no | no | <1% | −10.4 |
| 16-E | no | no | <1% | 41.8 |
| 17-E | no | no | <1% | 50.5 |
| 18-E | no | no | <1% | 11.2 |
| 19-E | no | no | <1% | 19.0 |
| 20-E | no | no | <1% | 44.4 |
| 21-E | no | no | <1% | 36.2 |
| 22-E | no | no | <1% | −53.5 |
| 23-E | no | no | 2.1% | 13.3 |
| 24-E | no | no | <1% | 23.6 |
| 25-E | no | no | <1% | 2.9 |
| 26-E | no | no | <1% | 24.9 |

EXAMPLE 6: Chain Transfer Agent

The emulsion polymerizations in this example were carried out in a 5-liter round bottom flask with four necks equipped with a mechanical stirrer, temperature control device, condenser, monomer and initiator feed lines and a nitroget inlet. One thousand two hundred grams of deionized water, 0.53 grams of sodium carbonate, 1.13 grams of Solusol™ sulfonated ester surfactant (75% solution in water) and methyl β-cyclodextrin (50.8% solution in water) at a level according to Table 6.1 were introduced into the reaction flask at room temperature.

TABLE 6.1

| Emulsion Polymer | Level of methyl β-cyclodextrin (mole % based on n-DDM) | Weight of methyl β-cyclodextrin (grams) |
|---|---|---|
| 3C-E (Comparative) | 0 | 0 |
| 27-E | 0.52 | 1.21 |
| 28-E | 1.04 | 2.42 |
| 29-E | 2.08 | 4.84 |
| 30-E | 4.17 | 9.68 |
| 31-E | 8.33 | 19.37 |

The contents were heated to 80° C. while stirring under nitrogen purge. An initiator solution of one gram of sodium persulfate and 174 grams of deionized water were prepared and 35 grams of the initiator solution was charged to the kettle. An emulsified monomer mix of 252 grams of deionized water, 21.53 grams of Solusol™ sulfonated ester surfactant (75% solution in water), 250 grams of n-vinyl pyrrolidone, 740 grams of ethyl acrylate and 20 grams of n-dodecylmercaptan was prepared. A methacrylic acid solution of 10 grams of methacrylic acid in 135 grams of deionized water was prepared.

At 80° C., the emulsified monomer mix, methacrylic acid solution and the remainder of the initiator solution were fed to the reaction flask over a period of four hours. After the emulsified monomer mix, methacrylic acid solution and the remainder of the initiator solution had been fed to the reaction flask, the dispersion was held at 80° C. for 30 minutes and then cooled to room temperature. The composition of the final polymer was 25 NVP/74 EA/1 MAA.

The molecular weight of each emulsion polymer was measured by gel permeation chromatography. Table 6.2 summarizes the molecular weight data.

TABLE 6.2

| Emulsion Polymer | Level of methyl β-cyclodextrin (mole % based on n-DDM) | Weight-Average molecular weight of polymer | Number-Average molecular weight of polymer |
|---|---|---|---|
| 3C-E (Comparative) | 0 | 62,300 | 14,600 |
| 27-E | 0.52 | 51,500 | 13,300 |
| 28-E | 1.04 | 45,900 | 11,800 |
| 29-E | 2.08 | 39,800 | 10,100 |
| 30-E | 4.17 | 37,000 | 9,860 |
| 31-E | 8.33 | 36,000 | 8,280 |

The data indicated that complexing methyl β-cyclodextrin with the n-dodecylmercaptan (hydrophobic chain transfer agent) improved the efficiency of the n-dodecylmercaptan in reducing the weight-average and number-average molecular weight of the emulsion polymers into which the hydrophobic chain transfer agent was incorporated. Increasing levels of methyl β-cyclodextrin (hydrophobic chain transfer agent) further improved the efficiency of the n-dodecylmercaptan.

EXAMPLE 7: Applications Testing

Latex films were prepared from Emulsion Polymers 19-E, 24-E, 25-E and 26-E by drying 10 grams of each in separate 4-inch diameter petri dishes. Small pieces were cut from the films, weighed and then soaked in deionized water. The pieces were extracted periodically, surface water patted dry and weighed to determine the amount of water absorbed. The results are reported in Table 7.1 as weight percent water absorbed based on total weight of the film.

TABLE 7.1

| Emulsion Polymer | Days | | | | | |
|---|---|---|---|---|---|---|
| | 0.7 | 3.7 | 7.0 | 15 | 25 | 35 |
| 25-E | 4.0 | 11.2 | 16.0 | 23.8 | 33.0 | 40.4 |
| 19-E | 2.5 | 5.5 | 7.5 | 10.4 | 13.3 | 15.6 |
| 26-E | 22.7 | 83.7 | 122.8 | 168.9 | 184.5 | 188.9 |
| 24-E | — | 73.0 | 89.6 | 125.0 | 140.4 | — |

The data indicated that emulsion polymers formed from more hydrophobic monomers (Emulsion Polymers 19-E and 24-E from LMA compared to Emulsion Polymer 25-E from 2-EHA and Emulsion Polymer 26-E from BA) absorb less water under identical conditions.

I claim:

1. A method for forming in an aqueous system a polymer containing, as polymerized units, at least one monomer having low water solubility, comprising the steps of:
   (a) complexing at least one monomer having low water solubility with a macromolecular organic compound selected from the group consisting of cyclodextrin, cyclodextrin derivative, cycloinulohexose, cycloinuloheptose, cycloinuloctose, calyxarene and cavitand; and
   (b) polymerizing in an aqueous system from about 0.1% to about 100% by weight of said monomer, based on the total weight of the polymer, of said complexed monomer having low water solubility with from about 0% to about 99.9% by weight, based on the total weight of the polymer, of at least one monomer having high water solubility.

2. A method for forming in an aqueous system a polymer having low water solubility containing, as polymerized units, monomer having high water solubility, comprising the steps of:
   (a) forming a reaction mixture comprising:
      (i) a monomer having high water solubility; and
      (ii) a macromolecular organic compound selected from the group consisting of cyclodextrin, cyclodextrin derivative, cycloinulohexose, cycloinuloheptose, cycloinuloctose, calyxarene and cavitand; and
      (iii) water
   (b) polymerizing said reaction mixture.

3. The method of claims 1 or 2 wherein said macromolecular organic compound is a cyclodextrin selected from the group consisting of α-cyclodextrin, β-cyclodextrin and γ-cyclodextrin.

4. The method of claim 3 wherein said macromolecular organic compound is a cyclodextrin derivative selected from the group consisting of the methyl, triacetyl, hydroxypropyl and hydroxyethyl derivatives of α-cyclodextrin, β-cyclodextrin and γ-cyclodextrin.

5. The method of claim 4 wherein said macromolecular organic compound is methyl-β-cyclodextrin.

6. The method of claims 1 or 2 wherein said polymer is formed by emulsion polymerization.

7. The method of claims 1 or 2 wherein said polymer is formed by solution polymerization.

8. The method of claim 7 further comprising the step of decomplexing said macromolecular organic compound from said polymer.

9. A method for improving the efficiency of a chain transfer agent having low water solubility, comprising the steps of:

(a) complexing a chain transfer agent having low water solubility with a macromolecular organic compound selected from the group consisting of cyclodextrin, cyclodextrin derivative, cycloinulohexose, cycloinuloheptose, cycloinuloctose, calyxarene and cavitand; and (b) adding said complex to a polymerization reaction selected from the group consisting of aqueous solution polymerization and emulsion polymerization.

* * * * *